United States Patent
Takahashi et al.

(10) Patent No.: US 9,796,894 B2
(45) Date of Patent: Oct. 24, 2017

(54) ABRASIVE MATERIAL REGENERATION METHOD AND REGENERATED ABRASIVE MATERIAL

(71) Applicant: KONICA MINOLTA, INC., Chiyoda-ku (JP)

(72) Inventors: Atsushi Takahashi, Hachioji (JP); Yuuki Nagai, Tachikawa (JP); Akihiro Maezawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/367,136

(22) PCT Filed: Dec. 5, 2012

(86) PCT No.: PCT/JP2012/081463
§ 371 (c)(1),
(2) Date: Jun. 19, 2014

(87) PCT Pub. No.: WO2013/094399
PCT Pub. Date: Jun. 27, 2013

(65) Prior Publication Data
US 2014/0331567 A1    Nov. 13, 2014

(30) Foreign Application Priority Data

Dec. 22, 2011  (JP) .................................. 2011-282037
Dec. 22, 2011  (JP) .................................. 2011-282041

(51) Int. Cl.
*B24B 57/02*   (2006.01)
*C02F 1/52*    (2006.01)
(Continued)

(52) U.S. Cl.
CPC ............ *C09K 3/1409* (2013.01); *B24B 57/00* (2013.01); *B24B 57/02* (2013.01); *B28D 5/007* (2013.01);
(Continued)

(58) Field of Classification Search
CPC ........ C02F 1/52; C02F 1/5209; C02F 1/5227; C02F 1/5236; C02F 1/5245; C02F 1/5254;
(Continued)

(56) References Cited

U.S. PATENT DOCUMENTS 1,997,114 A * 4/1935 Martin .................. B01D 37/03
                                               210/205
2,816,824 A * 12/1957 Wilansky ............. C09K 3/1463
                                               51/308

(Continued)

FOREIGN PATENT DOCUMENTS

CN    101280175    10/2008
EP    1465751      10/2004
(Continued)

OTHER PUBLICATIONS

International Preliminary Report on Patentability and a Written Opinion dated Jun. 24, 2014 in International Patent Application No. PCT/JP2012/081463.

(Continued)

*Primary Examiner* — Joseph Drodge
(74) *Attorney, Agent, or Firm* — Cozen O'Connor (57) ABSTRACT

Abrasive material regeneration method regenerates a cerium oxide abrasive material from a used abrasive material slurry containing the cerium oxide abrasive material and resulting from grinding a grinding subject having silicon as the primary component, characterized by regenerating the abrasive material containing cerium oxide through: a slurry (Continued)

recovery step (A) for recovering an abrasive material slurry discharged from a grinder; an isolation/concentration step (B) for adding a magnesium salt as an inorganic salt to the recovered abrasive material slurry, aggregating the abrasive material under the condition that the pH value of the mother liquor converted to 25 DEG C is at least 6.5 and less than 10.0, and thus isolating and concentrating the abrasive material from the mother liquor; and an abrasive material recovery step (C) for recovering the isolated and concentrated abrasive material.

10 Claims, 3 Drawing Sheets

(51) Int. Cl.
| | |
|---|---|
| C02F 1/66 | (2006.01) |
| C09K 3/14 | (2006.01) |
| B24B 57/00 | (2006.01) |
| B28D 5/00 | (2006.01) |
| C02F 101/10 | (2006.01) |
| C02F 103/12 | (2006.01) |
| C02F 103/34 | (2006.01) |

(52) U.S. Cl.
CPC .............. *C02F 1/5236* (2013.01); *C02F 1/66* (2013.01); *C02F 2101/10* (2013.01); *C02F 2103/12* (2013.01); *C02F 2103/346* (2013.01)

(58) Field of Classification Search
CPC .... C02F 1/5263; C02F 1/5272; C02F 1/5281; C02F 1/66; C02F 2101/10; C02F 2101/20; C02F 2103/12; C02F 2103/346; C09K 3/06; C09K 3/14; C09K 3/1409; B24B 3/06; B24B 57/02; B01D 21/02; B01D 11/0246; B01D 2221/14
USPC ..... 51/298, 309; 134/10; 210/702–738, 804; 451/36, 60, 87, 88, 446
See application file for complete search history.

(56) References Cited

U.S. PATENT DOCUMENTS

| | | | | |
|---|---|---|---|---|
| 4,419,246 A * | 12/1983 | Jayawant | ...................... | 210/721 |
| 5,593,339 A * | 1/1997 | Yam | .......................... | B08B 3/06 451/104 |
| 5,755,614 A | 5/1998 | Adams et al. | | |
| 6,001,265 A * | 12/1999 | Toyama et al. | ................ | 210/712 |
| 6,106,728 A * | 8/2000 | Iida et al. | ...................... | 210/743 |
| 6,221,118 B1 * | 4/2001 | Yoshida et al. | .................. | 51/309 |
| 6,258,277 B1 * | 7/2001 | Salmen et al. | ................. | 210/638 |
| 6,299,513 B1 * | 10/2001 | Tsuihiji et al. | .................. | 451/88 |
| 6,656,359 B1 * | 12/2003 | Osuda et al. | .................. | 210/636 |
| 6,746,309 B2 * | 6/2004 | Tsuihiji et al. | .................. | 451/28 |
| 6,821,437 B1 * | 11/2004 | Eisner et al. | .................. | 210/695 |
| 8,202,429 B2 * | 6/2012 | Abe | ..................... | B01D 61/025 134/10 |
| 8,894,733 B2 * | 11/2014 | Moon et al. | .................... | 51/309 |
| 2004/0016705 A1 * | 1/2004 | Umezawa et al. | ............ | 210/724 |
| 2007/0204519 A1 * | 9/2007 | Beppu et al. | ................... | 51/309 |
| 2008/0096475 A1 * | 4/2008 | Yoshida | ................... | C09G 1/02 451/60 |
| 2011/0070811 A1 * | 3/2011 | Neuber | .................. | B24B 37/04 451/60 |
| 2014/0144846 A1 * | 5/2014 | Grabbe et al. | ................ | 210/723 |

FOREIGN PATENT DOCUMENTS

| | | |
|---|---|---|
| JP | 6-254764 | 9/1994 |
| JP | 11-050168 | 2/1999 |
| JP | 11-090825 | 4/1999 |
| JP | 2000-254659 | 9/2000 |
| JP | 2001-308043 | 11/2001 |
| JP | 2004-306210 | 11/2004 |
| JP | 2010-214515 | 9/2010 |
| JP | 2011-041876 | 3/2011 |
| WO | WO 2006/137098 | 12/2006 |

OTHER PUBLICATIONS

Kinzoku-Shigen Report (Report regarding metal resources), 2010, 15 pages.
Office Action dated Nov. 3, 2015 which issued in the corresponding Chinese Patent Application No. 201280063306.0.
Office Action dated Jul. 15, 2016 which issued in the corresponding European Patent Application No. 12859923.0.
Office Action dated Dec. 19, 2016 which issued in the corresponding Chinese Patent Application No. 201280063306.0.
Office Action dated Jul. 28, 2017 which issued in the corresponding Korean Patent Application No. 2014-7016642.

* cited by examiner

ABRASIVE MATERIAL REGENERATION METHOD AND REGENERATED ABRASIVE MATERIAL

RELATED APPLICATIONS

This is a U.S. National stage of International application No. PCT/JP2012/081463 filed on Dec. 5, 2012.

This patent application claims the priority of Japanese application nos. 2011-282037 filed Dec. 22, 2011 and 2011-282041 filed Dec. 22, 2011, the disclosure content of both of which are hereby incorporated by reference.

FIELD OF THE INVENTION

The present invention relates to a method for regenerating an abrasive through collecting cerium oxide from a used cerium oxide-containing abrasive to reuse the collected cerium oxide as a regenerated cerium oxide-containing abrasive, and an abrasive regenerated through the method.

BACKGROUND ART

As an abrasive for finely polishing an object (e.g., an optical glass, a glass substrate for an information storage medium and a semiconductor silicon substrate) in a finishing process, a rare-earth oxide material mainly composed of cerium oxide and further containing lanthanum oxide, neodymium oxide and/or praseodymium oxide has been used.

Normally, the rare-earth element which is a main component of an abrasive, especially cerium oxide, relies on imported minerals because this element is obtained from a mineral that is not produced in Japan. A cerium oxide-containing abrasive is composed of fine particles with high degree of hardness and thus important for uses as an optical abrasive for electronic components such as optical lens, semiconductor silicone substrates and glass plates of liquid crystal displays. An abrasive for optical abrasion contains the above-mentioned cerium oxide, and may further contain a metal element (s) such as sodium and chromium and/or a rare-earth element(s) such as yttrium and dysprosium. Thus, an abrasive for optical abrasion is strictly inhibited from being simply disposed in view of environmental pollution. A waste liquid that contains cerium oxide used in polishing is therefore strongly desired to be made non-polluting. Hence, techniques to reuse a resource (s) in a waste liquid of an optical abrasive containing cerium oxide are important also in terms of making a non-polluting liquid.

In various fields of industry, a conventional method for disposing a waste liquid that contains suspended particles normally includes aggregating and separating the suspended particles using a neutralizer, inorganic coagulant or polymeric coagulant, discharging a treated liquid and disposing the aggregated and separated sludge.

A cerium-oxide abrasive is used in large quantity in a polishing process, and its waste liquid also contains a component(s) derived from the polished object (e.g., debris of a polished optical glass). In addition, it is difficult to efficiently separate the abrasive from the component (s) derived from the polished object. Because a waste liquid is disposed after use at present as described above, there are problems concerning environmental burdens and disposal cost.

Thus, it has been important to establish a method for efficiently collecting a main component of an abrasive for recycling the rare-earth element which is a scarce material.

As a method for collecting an abrasive component, Patent Document 1 discloses a solid-liquid separation method including adding an electrolyte is to a used abrasive liquid that contains a cerium oxide-based abrasive for polishing a glass, and maintaining the abrasive liquid temperature at 25° C. for 2 hours to dissolve a component (s) derived from a polished substrate (Si component or Al component), and separate the abrasive and let the abrasive settle out. In a method described in Patent Document 1, an alkali metal hydroxide, alkali metal carbonate, alkali metal salt and ammonium salt are used as the electrolyte.

Patent Document 2 discloses a method including adding poly aluminum chloride and a coagulant composed of a polymer to a used abrasive liquid that contains an abrasive mainly composed of cerium oxide to aggregate a solid component of the used abrasive, performing anhydration to obtain a dehydrated cake of the waste abrasive, mixing the waste abrasive with an aqueous sodium hydroxide or aqueous potassium hydroxide to dissolve a water-soluble impurity(ies), and collecting the abrasive by solid-liquid separation. Patent Document 3 discloses a method including adding sulfuric acid to a used abrasive, applying heat thereto, dissolving a rare-earth element or rare metal, and separating and removing an aggregate of silica etc. in the slurry.

Patent Document 4 discloses a method for collecting a colloidal silica-based abrasive, the method including conducting solid-liquid separation by addition of an alkali to a chemical mechanical polishing (CMP) waste liquid in the presence of a magnesium ion to adjust pH to 10 or higher and cause aggregation, adjusting the pH of the solid component in a pH adjusting tank to 9 or lower to elute the magnesium ion, and collecting the abrasive. Non-Patent Document 1 is a review article regarding the above-described metal-collecting methods.

However, the above methods disclosed by Patent Documents 1 to 4 provide a collected abrasive of insufficient purity. Such a collected abrasive is not suitable for fine polishing.

In the method of Patent Document 4, if an abrasive mainly composed of cerium oxide is used in polishing an object mainly composed of silicon such as a glass, addition of an additive such as magnesium chloride to an abrasive-containing slurry that contains a used abrasive at a pH of 10 causes co-aggregation of an abrasive component and a glass component, which lowers the purity of an obtained regenerated abrasive. This is because when the pH is over 10, a component (s) derived from a polished object mainly composed of silicon (e.g., glass) become easier to aggregate than the abrasive component upon addition of an additive.

Patent Document 5 discloses a method for producing a regenerated cerium oxide-containing abrasive by freezing a collected used liquid to regenerate a secondary particles of cerium oxide followed by removal of water. However, the method of Patent Document 5 requires a huge facilities for conducting the freezing and thus requires enormous initial investment.

PRIOR ART DOCUMENT

Patent Document

Patent Document 1: Japanese Patent Application Laid-Open Publication No. Hei06-254764

Patent Document 2: Japanese Patent Application Laid-Open Publication No. Hei11-90825

Patent Document 3: Japanese Patent Application Laid-Open Publication No. Hei11-50168

Patent Document 4: Japanese Patent Application Laid-Open Publication No. 2000-254659

Patent Document 5: Japanese Patent Application Laid-Open Publication No. 2010-214515

Non-Patent Document

Non-Patent Document 1: Kinzoku-Shigen Report (Report regarding metal resources) p. 45, November 2010.

SUMMARY OF THE INVENTION

Problems to be Solved by the Invention

The present invention is made in view of the above-described problems to provide a method for regenerating an abrasive, the method including efficiently collecting cerium oxide from a used abrasive mainly composed of cerium oxide and obtaining a regenerated abrasive in a simple manner, and a regenerated abrasive.

Means for Solving Problems

The present inventors have earnestly studied given the above problems, and found that a method for regenerating an abrasive through efficiently collecting cerium oxide from a used abrasive mainly composed of cerium oxide and obtaining a regenerated abrasive in a simple manner can be realized as a method for regenerating a cerium oxide-containing abrasive from a used abrasive that contains cerium oxide, the method including: (A) collecting an abrasive-containing slurry discharged from an abrasive device; (B) separating and concentrating the abrasive from a mother liquid, utilizing the difference of their specific weights, by adding a magnesium salt which is a divalent alkali earth metal salt as an inorganic salt to the collected abrasive-containing slurry and aggregating the abrasive under the condition that aggregates the abrasive selectively and does not aggregate debris derived from a polished object such as silica particles derived from a polished optical glass; and (C) collecting the separated and concentrated abrasive. The present invention is thus made.

That is, the above object of the present invention is accomplished by the following ways.

1. A method for regenerating a cerium oxide-containing abrasive from a used abrasive slurry that contains the abrasive and was used in polishing an object mainly composed of silicon, the method including:

(A) collecting an abrasive-containing slurry discharged from an abrasive device;

(B) separating the abrasive from a mother liquid and concentrating the abrasive by adding a magnesium salt as an inorganic salt to the collected abrasive-containing slurry and aggregating the abrasive at a converted pH ranging from 6.5 to less than 10.0 of the mother liquid at 25° C.; and (C) collecting the separated and concentrated abrasive.

2. The method of the item 1, further including:

(D) adjusting sizes of particles of the collected abrasive.

3. The method of the item 1 or 2, wherein a first abrasive-containing slurry that contains washing water and a second abrasive-containing slurry that was used are collected in the step (A).

4. The method of the item 3, wherein the first abrasive-containing slurry and the second abrasive-containing slurry collected in the step (A) are mixed before the steps (B) and (C).

5. The method of the item 3, wherein the first abrasive-containing slurry and the second abrasive-containing slurry collected in the step (A) are separately subjected to the steps (B) and (C).

6. The method of any one of the items 2 to 5, wherein in the step (C), the collecting is conducted through separation by decantation utilizing spontaneous sedimentation.

7. The method of any one of the items 1 to 6, wherein in the step (D), a dispersing agent is added to a liquid of the collected abrasive, and thereafter dispersion is conducted using an ultrasonic disperser or a bead mill disperser to control the sizes of the particles of the regenerated abrasive.

8. The method of the item 7, wherein the disperser used in the step (D) is the ultrasonic disperser.

9. The method of the item 7 or 8, wherein the dispersing agent is composed of a poly-carboxylic acid-based polymer.

10. A regenerated abrasive produced by the method of any one of the items 1 to 9.

Effects of the Invention

By virtue of the above ways of o the present invention, there is provided a method for regenerating an abrasive through efficiently collecting cerium oxide from a used abrasive mainly composed of cerium oxide and obtaining a regenerated abrasive in a simple manner, and a regenerated abrasive.

The mechanisms of the above effect of the present invention are not fully and definitively revealed, but the following reasoning can be made.

The effect of the present invention is characterized in that the method for selectively collecting cerium oxide which is a main component of an abrasive from the used abrasive-containing slurry in high concentration enables not only collection of cerium oxide but also collection of the abrasive in high concentration and easy regeneration of the collected abrasive.

The technical idea is utilizing a presumable specific interaction between cerium oxide and the inorganic salt, namely, a magnesium salt which is a divalent alkali earth metal salt. It is common to add a coagulant having high specific weight to a used abrasive to separate the used abrasive as a solid component, followed by purification of the cerium oxide for regenerating the abrasive. In the collected cerium oxide which is a solid component or in the abrasive-containing slurry that contains cerium oxide, a glass component derived from a polished object and generated in glass polishing such as silicon dioxide particles are also included. To separate this glass component, further various processes are required.

On the other hand, in the method of the present invention, a magnesium salt which is a divalent alkali earth metal salt is selectively interacted with cerium oxide to selectively aggregate the cerium oxide, whereas a glass component which is not an abrasive component is hardly aggregated. The method of the present invention can therefore efficiently separate them. This feature enables selective separation of high-purity cerium oxide and does not require a subsequent purification. Thus, the method of the present invention can simplify a steps) after the separation.

In the present invention, it is needed to maintain the pH of the mother liquid of a first abrasive-containing slurry to be in a predetermined range equal to or less than the pH after the addition of a magnesium salt, upon the end of adding a magnesium salt to the separation of an aggregate without adding a pH adjusting agent, unlike conventional methods. In the present invention, the pH after the addition of a magnesium salt means the pH right after (upon) the end of adding a magnesium salt.

It is also found that the magnesium salt used in the collecting step is partially absorbed in cerium oxide particles and thus remains in the regenerated cerium oxide-containing abrasive, and found that this magnesium salt is bonded to cerium oxide via a peculiar bond and prevents cerium oxide from becoming too fine particles in a future use as an abrasive.

EMBODIMENTS FOR CARRYING OUT THE INVENTION

A method for regenerating an abrasive according to an embodiment of the present invention is a method for regenerating a cerium oxide-containing abrasive from a used cerium oxide-containing abrasive, the method including: 1) a slurry collecting step A in which an abrasive-containing slurry discharged is collected from an abrasive device; 2) a separating and concentrating step B in which a magnesium salt is added as an inorganic salt to the collected abrasive-containing slurry at a converted pH ranging from 6.5 to less than 10 of a mother liquid at 25° C. so as to aggregate the abrasive selectively and not to aggregate a non-abrasive component (s) and then separate the abrasive from the mother liquid and concentrate the abrasive; and 3) an abrasive collecting step C in which the separated and concentrated abrasive is collected.

Preferably, the method further includes a particle size adjusting step D after the abrasive collecting step C. In the slurry collecting step A, it is preferable to collect a first abrasive-containing slurry that contains washing water and a second abrasive-containing slurry that was used, both of which are discharged from the abrasive device. In the slurry collecting step A, it is also preferable that the first abrasive-containing slurry and the second abrasive-containing slurry which were collected in the slurry collecting step A are mixed to prepare a mother liquid and thereafter subjected to the separating and concentrating step B and the abrasive collecting step C, or the first abrasive-containing slurry and the second abrasive-containing slurry which were collected in the slurry collecting step A are separately subjected to the separating and concentrating step B and the abrasive collecting step C. Preferably, in the abrasive collecting step C, the abrasive is collected through separation by decantation utilizing spontaneous sedimentation. In the particle size adjusting step D, it is preferable that the particle size is adjusted through adding a dispersing agent to a liquid of the collected abrasive followed by dispersion using an ultrasonic disperser or a bead mill disperser. To achieve the effects of the present invention more sufficiently, the disperser used in the particle size adjusting step D is preferably an ultrasonic disperser, and the dispersing agent is preferably a dispersing agent composed of a poly carboxylic acid-based polymer.

The present invention, and elements and embodiments thereof will now be described in detail. Ranges of values expressed with "(from) A to B" in the following description include the values A and B as the minimum and maximum values of the ranges.

<<Method for Regenerating Abrasive>>

A flow chart of the method of an embodiment of the present invention for regenerating an abrasive will now be described.

Figure 1:
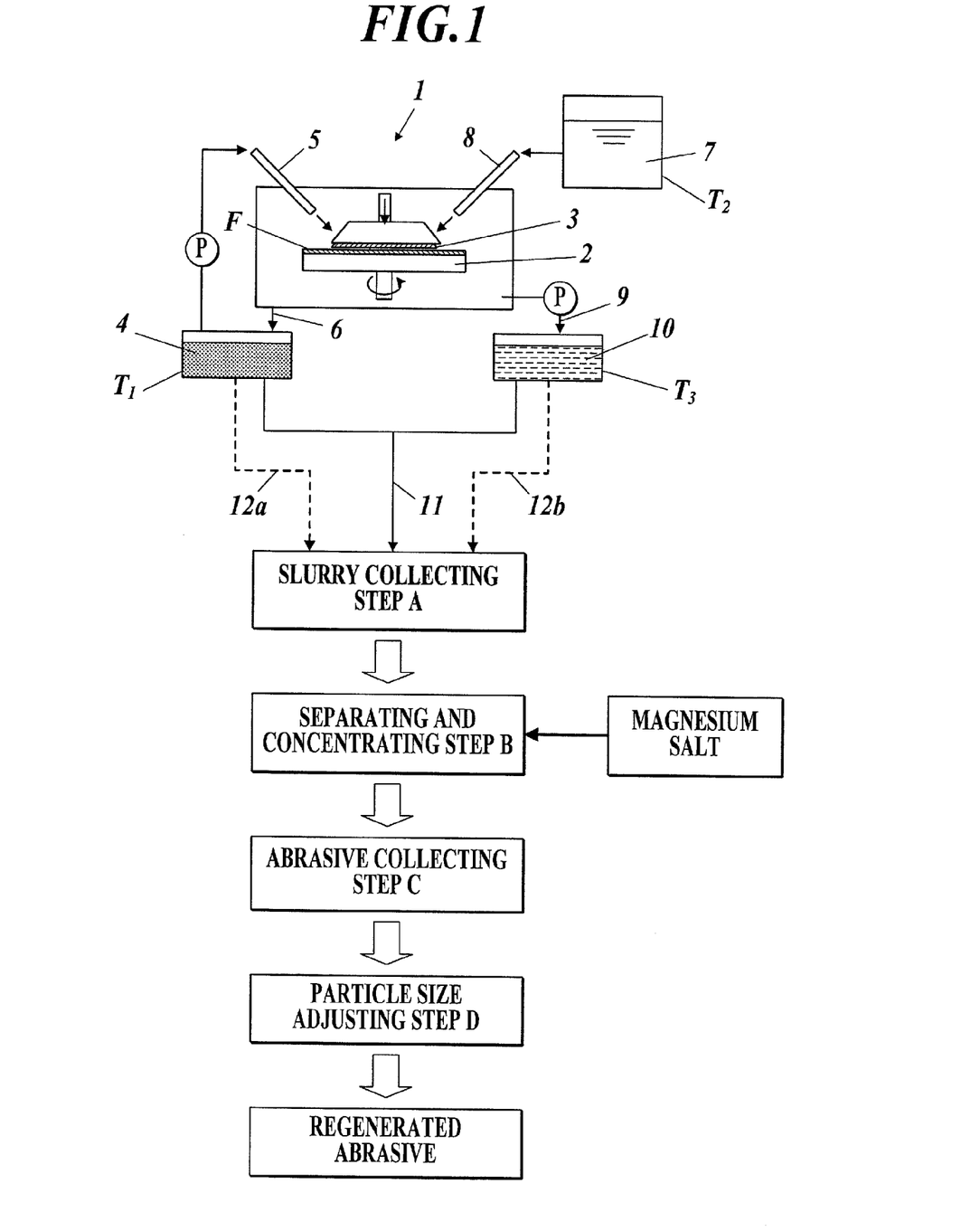
FIG. 1 This is a schematic diagram illustrating a flow chart of elemental steps of the method of the present invention for regenerating an abrasive.

FIG. 1 is a schematic diagram illustrating a flow chart of elemental steps of the method of the present invention for regenerating an abrasive.

In a polishing process illustrated in FIG. 1, an abrasive device 1 includes an abrasive surface plate 2 on which an abrasive cloth F composed of a non-woven cloth, synthetic resin foam or synthetic leather is adhered. The abrasive surface plate 2 is rotatable. In polishing, the abrasive surface plate 2 is rotated while an object 3 to be polished (e.g., glass) is pushed against the abrasive surface plate 2 with a predetermined pressure force. Simultaneously, a cerium oxide-containing abrasive liquid 4 (i.e., the second abrasive-containing slurry) is supplied through a slurry nozzle 5 using a pump. The cerium oxide-containing abrasive liquid 4 passes through a flow pass 6 and is then put and pooled in a slurry tank $T_1$. The cerium oxide-containing abrasive liquid 4 is repeatedly circulated through the abrasive device 1 and the slurry tank $T_1$.

Washing water 7 is pooled in a washing water tank $T_2$, and for washing the abrasive device 1, sprayed through a washing water-spraying nozzle 8 to a polishing portion. Then, an abrasive-containing wash liquid 10 (i.e., the first abrasive-containing slurry) passes through a flow pass 9 using a pump and is put and pooled in a wash liquid tank $T_3$. The wash liquid tank $T_3$ is used for pooling the wash liquid that was used in the washing (rinsing). The pooled liquid is continuously stirred using a stirring blade to avoid sedimentation and aggregation.

The abrasive liquid 4 that is pooled in the slurry tank $T_1$ and was repeatedly circulated and used (i.e., the second abrasive-containing slurry) and the wash liquid 10 that is pooled in the wash liquid tank $T_3$ (i.e., the first abrasive-containing slurry) are both contain not only particles of cerium oxide which is the abrasive but also a non-abrasive component(s) removed from the polished object 3 (e.g., glass) which is polished in the polishing process.

Subsequently, the abrasive liquid 4 (the second abrasive-containing slurry) and the wash liquid 10 (the first abrasive-containing slurry) are mixed and then collected, or are separately collected. This step is defined as the slurry collecting step A.

Thereafter, to a mixture of or each of the abrasive liquid 4 (the second abrasive-containing slurry) and the wash liquid 10 (the first abrasive-containing slurry) which were collected in the slurry collecting step A (the mixture of these liquids is called a mother liquid, and each liquid is called a mother liquid), a divalent alkali earth metal salt is added as an inorganic salt without adding any pH adjusting agent under the condition that aggregates the abrasive selectively and does not aggregate a non-abrasive component (s) (e.g., glass powder) to separate only the abrasive from the mother liquid and concentrate the abrasive (the separating and concentrating step B).

Then, liquid-solid separation is conducted utilizing spontaneous sedimentation. No forcible way is employed in this separation to separate the mother liquid into a supernatant containing the non-abrasive component (s) etc. and a concentrate containing cerium oxide sediment. Thereafter, the supernatant is disposed by decantation, e.g., tilting of the container, or by putting a discharging pipe to reach near the interface between the supernatant and the concentrate in the container in which the separation is conducted, so as to discharge only the supernatant from the container and collect the abrasive (the abrasive collecting step C).

In the separated cerium oxide-containing concentrate, particles of cerium oxide form aggregates (i.e., secondary particles) together with the inorganic salt. In order to break the aggregates into almost pure primary particles, water and a dispersing agent are added, and a dispersing device is used to obtain particles with desired sizes (the particle size adjusting step D).

The regenerated abrasive of high-quality can be thus obtained in such a simple manner.

Details of the method of the embodiment of the present invention for regenerating an abrasive and techniques for the method will now be described.

[Abrasive]

Generally, fine particles of Bengala ($\alpha$ $Fe_2O_3$), cerium oxide, aluminum oxide, manganese oxide and/or zirconium oxide, or colloidal silica is dispersed as an abrasive in water or oil to form a slurry, and it is used for polishing optical glasses, semiconductor substrates and the like. On the other hand, an abrasive used in the present invention is mainly composed of cerium oxide. This abrasive is applicable to Chemical Mechanical Polishing (CMP). CMP utilizes mechanical and chemical actions and achieves sufficient speed and highly fine flatness in polishing the surface of a semiconductor substrate or a glass.

Actually, the cerium oxide widely used as an abrasive is not pure cerium oxide but is so-called bastnaesite which is prepared by sintering a mineral ore rich in rare earth elements and crashing the mineral ore. In this cerium oxide, cerium oxide is present as a main component. In addition, other rare earth elements such as lanthanum, neodymium, praseodymium and the like are also contained in the cerium oxide. Fluorides of them may be contained in the cerium oxide in addition to oxides of them.

The composition and shape of cerium oxide used in the present invention is not particularly limited. A commercially available cerium oxide can be used as the abrasive in the present invention. Preferably, the concentration of cerium oxide is 50% by mass or more in cerium oxide to achieve the effects of the present invention more sufficiently.

[Polishing Process]

The abrasive is used in the following way (polishing process). The present invention is a method for efficiently regenerating an abrasive from a used abrasive that is used as described below.

Taking polishing of a glass substrate as an example, a polishing process is normally composed of preparing an abrasive-containing slurry, polishing and washing, as illustrated in FIG. 1.

(1) Preparation of Abrasive-Containing Slurry

Powder of an abrasive mainly composed of cerium oxide is added in an amount of 1 to 40% by mass to a solvent such as water and then dispersed in the solvent to obtain an abrasive-containing slurry. This abrasive-containing slurry is circulated through an abrasive device and used. The cerium oxide powder (fine particles) used as the abrasive has an average size ranging from several dozen nanometers to several micrometers.

By adding a dispersing agent and the like, aggregation of the cerium oxide particles can be prevented. Preferably, dispersing state is maintained by stirring using a stirrer or the like. In general, it is preferable that a tank used for pooling an abrasive-containing slurry is arranged next to an abrasive device, dispersing state is maintained using a stirrer or the like, and the abrasive-containing slurry is supplied to the abrasive device and circulated through the abrasive device using a supplying pump.

(2) Polishing

As illustrated in FIG. 1, a glass substrate is polished by bringing the glass substrate into contact with the abrasive pad (abrasive cloth) and moving the glass substrate and the abrasive pad relative to each other applying pressure force with the supplementation of the abrasive-containing slurry to the contacting portion.

(3) Washing

When the polishing is finished, a large quantity of the abrasive is present on the glass substrate and the abrasive device. Thus, water or the like is supplied in place of the abrasive-containing slurry after the polishing to wash the abrasive to remove it from the glass substrate and the abrasive device. Then, the washing water that contains the abrasive is discharged to the outside of the polishing system.

As a result of the washing, a certain amount of the abrasive is discharged to the outside of the polishing system, and thus the amount of the abrasive in the polishing system is reduced. To make up for this reduction, a fresh abrasive-containing slurry is newly supplied to the slurry tank $T_1$. The addition may be conducted once every polishing process or once every predetermined times of repeated polishing process. Preferably, the abrasive is in a well-dispersed state in the solvent in the supplementation.

[Used Abrasive-Containing Slurry]

In the present invention, the used abrasive-containing slurry is the abrasive-containing slurry discharged to the outside of the system including the abrasive device and the tank used for the abrasive-containing slurry, and is categorized into the following two types.

One is the first abrasive-containing slurry which contains the washing water discharged in the washing process (a rinse slurry), and the other is the second abrasive-containing slurry that was used and is pooled in the slurry tank $T_1$ (a life-ended slurry). In the present invention, they are called the first abrasive-containing slurry and the second abrasive-containing slurry, respectively. The present invention is preferably applied to both of the first abrasive-containing slurry and the second abrasive-containing slurry, but may be applied to either of them.

The first abrasive-containing slurry which contains the washing water is characterized by the following two features.

1) This is discharged in the washing. Thus, this slurry contains a large amount of the washing water and the concentration of the abrasive in this slurry is lower than that of the slurry in the tank.

2) The glass component which was present on the abrasive cloth or the like is included in this slurry as a result of the washing.

On the other hand, the second abrasive-containing slurry is characterized in that the concentration of the glass component is higher than that of a fresh abrasive-containing slurry.

[Regeneration of Abrasive Containing Cerium Oxide]

In the present invention, the method for regenerating the abrasive and producing the regenerated cerium oxide-containing abrasive is mainly composed of four steps, namely, the slurry collecting step A, the separating and concentrating step B, the abrasive collecting step C and the particle size adjusting step D.

(1: Slurry Collecting Step A)

In this step, the abrasive-containing slurry discharged from the system composed of the abrasive device and the slurry tank is collected. The slurry to be collected in this step is categorized into the first abrasive-containing slurry which contains the washing water and the second abrasive-containing slurry which was used.

Generally, the concentration of the cerium oxide-containing abrasive in the collected abrasive-containing slurry is 0.1 to 40% by mass.

The collected slurry may be immediately subjected to the separating step or may be pooled to obtain a certain amount of the collected slurry. In each case, it is preferable to continuously stir the collected slurry to maintain the dispersing state.

In the present invention, the first abrasive-containing slurry and the second abrasive-containing slurry collected in the slurry collecting step A may be mixed with each other to prepare the mother liquid and then subjected to the separating and concentrating step B and the abrasive collecting step C. Otherwise, the first abrasive-containing slurry and the second abrasive-containing slurry collected in the slurry collecting step A may be separately subjected to the separating and concentrating step B and the abrasive collecting step C as the mother liquids independent from each other.

(2: Separating and Concentrating Step B)

Each collected slurry which was used contains a glass component derived from the polished object. The concentration of the abrasive is decreased due to influx of the washing water. To use the slurry again for the polishing, the glass component is required to be separated, and the abrasive component is required to be concentrated.

In the separating and concentrating step B of the present invention, a magnesium salt which is a divalent alkali earth metal salt is added as an inorganic salt to the collected slurry (mother liquid) which was collected in the slurry collecting step A at a converted pH ranging from 6.5 to less than 10 of the mother liquid so as to aggregate only the abrasive and so as not to aggregate the non-abrasive component (s). Hence, the abrasive component mainly composed of cerium oxide is aggregated, and then sedimentation occurs. Thereafter, the aggregate is separated from the supernatant which contains most of the glass component. Thus, this step enables both of the separation of the cerium oxide component from the glass component and the concentrating in the abrasive-containing slurry.

Specific operations will now be described with reference to FIG. 2.

Figure 2:
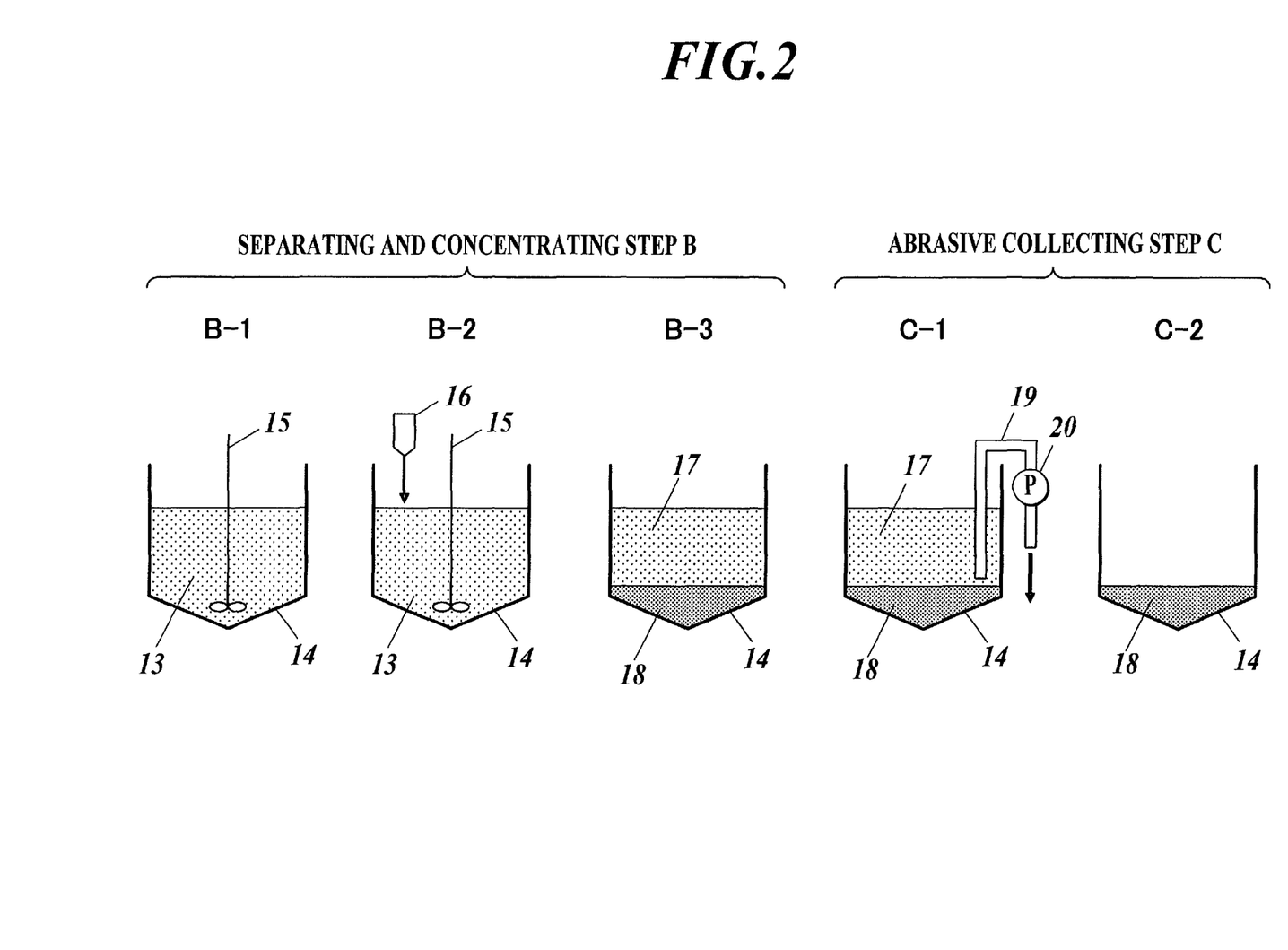
FIG. 2 This is a schematic diagram illustrating an example of a flow in a separating and concentrating step B and an abrasive collecting step C.

FIG. 2 is a schematic diagram illustrating an example of a flow in a separating and concentrating step B and an abrasive collecting step C.

As a step (B-1), the abrasive-containing slurry (mother liquid) 13 which is collected in the previous step, i.e., the slurry collecting step A is poured into a conditioning container 14 equipped with a stirrer 15. Thereafter, as a step (B-2), a magnesium salt which is a divalent alkali earth metal salt is added as an inorganic salt from a adding flask 16 to the abrasive-containing slurry (mother liquid) 13 being stirred at a converted pH ranging from 6.5 to less than 10 of the mother liquid at 25° C. Subsequently, in a step (B-3), the cerium oxide particles in the abrasive-containing slurry (mother liquid) 13 is selectively aggregated as a result of the addition of the inorganic salt, and then sedimentation of the aggregate occurs to form an aggregate 18. In a supernatant 17 from which the separated sediment of the cerium oxide is removed contains a non-abrasive component(s) such as a glass component. The abrasive and non-abrasive components are thus separated from each other.

<Divalent Alkali Earth Metal Salt>

In the present invention, the inorganic salt used for aggregating the cerium oxide is a divalent alkali earth metal salt.

Examples of the divalent alkali earth metal salt used in the present invention include calcium salts, barium salts, beryllium salts and magnesium salts. Among them, magnesium salts are preferable to achieve the effects of the present invention more sufficiently.

Any electrolyte magnesium salt may be used in the present invention without particular limitation. In terms of high solubility in water, magnesium chloride, magnesium bromide, magnesium iodide, magnesium sulfate and magnesium acetate are preferable. In terms of a small change in pH and easiness of treating the sediment of the abrasive and the waste liquid, magnesium chloride and magnesium sulfate are particularly preferable.

<Method for Adding Divalent Alkali Earth Metal Salt>

A method for adding the divalent alkali earth metal salt will now be described.

a) Concentration of Magnesium Salt

Powder of the magnesium salt may be directly added to the collected slurry, or the magnesium salt may be dissolved in a solvent such as water and then added to the abrasive-containing slurry. It is preferable that the magnesium salt is dissolved in a solvent and then added to the abrasive-containing slurry to obtain homogeneous concentration in the slurry after the addition.

The concentration is preferably 0.5 to 50% by mass in an aqueous solution. To suppress a change in pH of the system and achieve more efficient separation of the glass component, the concentration is preferably 10 to 40% by mass.

b) Temperature in Adding Magnesium Salt

The temperature when the magnesium salt is added may be in the range from the freezing temperature of the collected abrasive-containing slurry to 90° C. To efficiently separate the glass component, the temperature is preferably 10 to 40° C., and more preferably 15 to 35° C.

c) Speed of Adding Magnesium Salt

Speed of adding the magnesium salt is preferably adjusted so that the concentration of the added magnesium salt in the collected abrasive-containing slurry is not largely changed immediately and the added magnesium salt is homogeneously present in the collected abrasive-containing slurry. The amount of the added magnesium salt per minute is preferably 20% by mass or less, more preferably 10% by mass or less, per the total amount of the magnesium salt to be added.

d) pH Value after Addition of Magnesium Salt

In the separating and concentrating step B of the present invention, the magnesium salt is added and then separation and concentration is conducted at a converted pH ranging from 6.5 to less than 10 of the mother liquid at 25° C. Generally, the collected abrasive-containing slurry exhibits alkalinity and its pH ranges from 8 to less than 10 because of the presence of the glass component. Thus, it is not needed to adjust the pH of the collected abrasive-containing slurry in advance.

In the present invention, the pH value is obtained from the measurement at 25° C. using the Lacombe tester bench pH meter (pH1500, manufactured by AS ONE CORPORATION).

In the present invention, the pH value is equal to or less than the pH value after the addition of the magnesium salt upon the addition of the magnesium salt to the separation of the aggregate. In the present invention, the pH value after the addition of the magnesium salt is the pH value right after (upon) the end of adding the magnesium salt.

Until the end of separating the aggregate, the pH is equal to or less than the pH value after the addition of the magnesium salt. Specifically, the pH ranges from 6.5 to less than 10, which pH is a converted pH at 25° C. To maintain the pH value under 10, the glass component in the waste liquid can be prevented from being aggregated, and thus the purity of the collected cerium oxide can increase.

The minimum value of the pH after the addition of the magnesium salt is 6.5 or more considering decrease in the purity due to a pH adjusting agent and handleability.

e) Stirring after Addition of Magnesium Salt

After the addition of the magnesium salt, the stirring is continued for preferably 10 minutes or more, and more preferably 30 minutes or more. Upon the addition of the magnesium salt, the aggregation of the abrasive particles starts. The continuous stirring makes the aggregation state homogeneous in the liquid and reduces the particle size distribution, which makes the following separation easy.

(3: Abrasive Collecting Step C)

In the separating and concentrating step B, the aggregate 18 is separated from the supernatant 17 which contains the glass component, and then the aggregate 18 is collected, as illustrated in FIG. 2.

a) Method for Separating Aggregate of Abrasive

A commonly-used method for separating an aggregate can be used as the method for separating the aggregate of the abrasive which is obtained by adding the magnesium salt from the supernatant. For example, spontaneous sedimentation can be utilized to remove only the supernatant for separating the supernatant. A method utilizing physical actions such as a method using a centrifugal separator can also be employable. In terms of the purity of the regenerated cerium oxide-containing abrasive, a method utilizing spontaneous sedimentation is preferable.

In the sedimentation state, its specific weight is higher than that of the collected slurry because the supernatant is separated, and thus the cerium oxide is concentrated. The concentration of the cerium oxide in this concentrated slurry is higher than that of the collected slurry.

For example, the separation of the aggregate of the abrasive from the supernatant can be conducted as follows. As illustrated in FIG. 2, the concentrate 18 which contains the cerium oxide settled at the bottom is separated from the supernatant 17 which contains the non-abrasive component(s) utilizing spontaneous sedimentation as the step (B-3). Thereafter, the discharging pipe 19 is put in the container 14 to reach near the interface between the supernatant 17 and the concentrate 18, and then only the supernatant 17 is discharged to the outside of the container using the pump 20, as the step (C-1). Subsequently, the concentrate 18 which contains the abrasive is collected as the step (C-2).

(4: Particle Size Adjusting Step D)

In the method of the present invention for regenerating an abrasive, the particle size distribution of particles of the cerium oxide is adjusted as a final step to make the used abrasive collected through the above steps reusable.

The collected aggregate of the cerium oxide obtained by adding the magnesium salt or the like is composed of lumps of secondary particles. Thus, for the purpose of the reuse, it is preferable to conduct the particle size adjusting step D to cause re-dispersion through breaking the aggregate into pure particles (i.e., primary particles) as a final step.

In the particle size adjusting step D, the aggregate of the abrasive generated in the separating and concentrating step B is re-dispersed to adjust the particle size distribution to be equivalent to that in the un-treated abrasive slurry.

Examples of the method for re-dispersing the aggregate of the abrasive particles are as follows: a) water is added to lower the concentration of the magnesium ion in the liquid; b) a metal-separating agent (or a dispersing agent) is added to lower the concentration of the magnesium ion on the abrasive; and c) the aggregate of the abrasive particles is cracked using a dispersing device or the like.

One of these methods can be used alone, or two or more of them may be used in combination. Preferably, any two of the methods a), b) and c) are used in combination. More preferably, all of the methods a), b) and c) are used in combination.

In the case of adding water, the amount of water to be added is adjusted according to the volume of the concentrated slurry. Generally, the amount of water is 5 to 50% by volume of the concentrated slurry, and preferably 10 to 40% by volume of the concentrated slurry.

Preferable examples of the metal-separating agent (dispersing agent) include agents composed of a poly-carboxylic acid-based polymer. An acrylic acid-maleic acid copolymer is particularly preferable. Specifically, LITY A-550 (manufactured by Lion Corporation) is given as an example. The amount of the metal-separating agent (dispersing agent) to be added to the concentrated slurry is preferably 0.01 to 5% by volume.

Examples of the dispersing device include ultrasonic dispersers and media mills such as sand mills and bead mills. Ultrasonic dispersers are particularly preferable.

For example, ultrasonic dispersers are available from SMT Corporation, Ginsen Corporation, TAITEC Corporation, BRANSON, Kinematica AG, and NISSEI Corporation. Examples include UDU-1 and UH-600MC manufactured by SMT Corporation, GSD600CVP manufactured by Ginsen Corporation and RUS600TCVP manufactured by NISSEI Corporation. The frequency of ultrasonic is not particularly limited.

Examples of circulating type devices that conduct mechanical stirring and ultrasonic dispersion simultaneously include, but are not limited to, UDU-1 and UH-600MC manufactured by SMT Corporation, GSD600CVP and GSD1200RCVP manufactured by Ginsen Corporation and RUS600TCVP manufactured by NISSEI Corporation.

Figure 3:
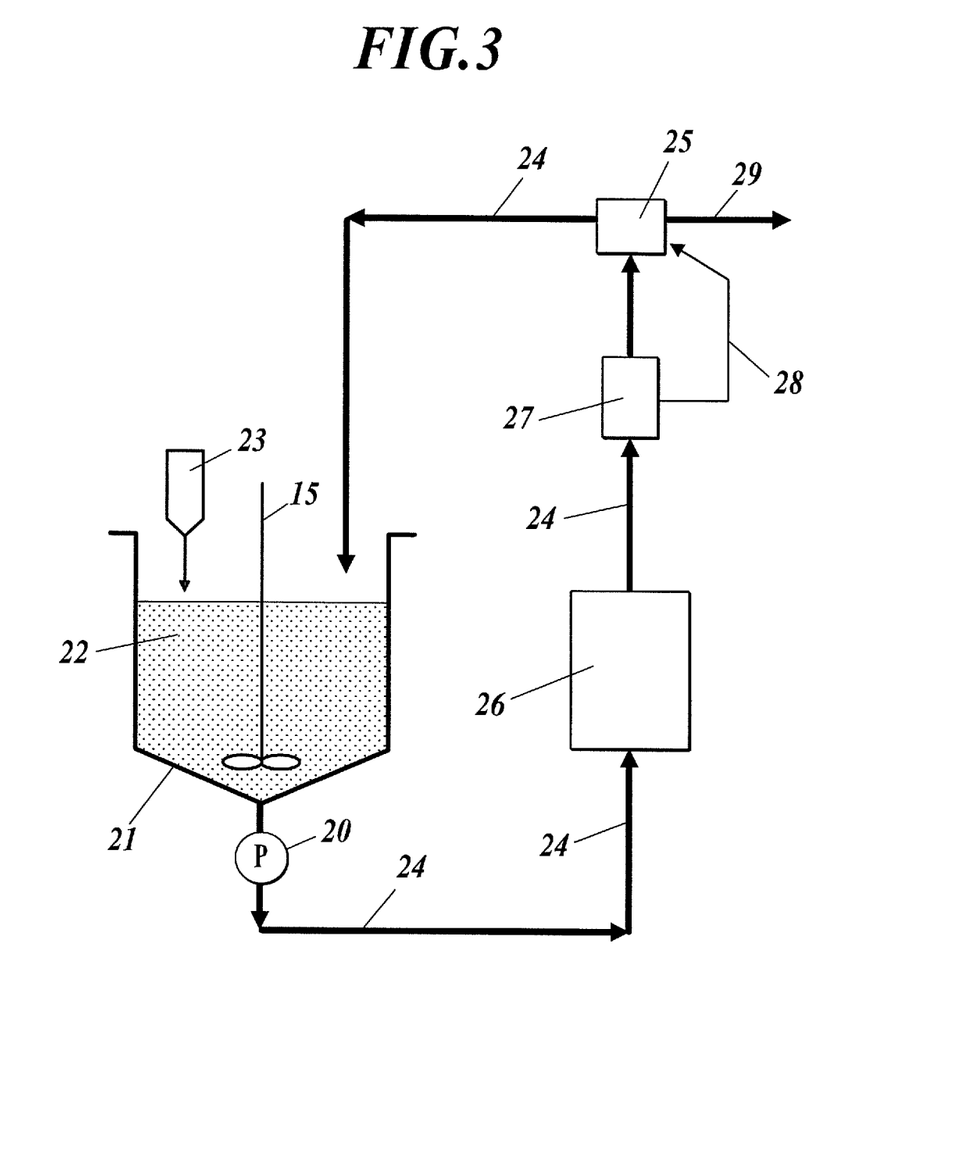
FIG. 3 This is a schematic diagram illustrating an example of a particle size adjusting step D using an ultrasonic disperser.

FIG. 3 is a schematic diagram illustrating an example of the particle size adjusting step D using an ultrasonic disperser.

As illustrated in FIG. 3, to the aggregate obtained in the abrasive collecting step C in a conditioning container 21, a) water is added to lower the concentration of the magnesium salt in the liquid to prepare a cerium oxide-dispersing liquid 22 and pools it in the conditioning container 21. Then, the metal-separating agent (dispersing agent composed of a polymer) described in the above b) is added from 23 to the cerium oxide-dispersing liquid 22 being stirred using a stirrer 15. Thereafter, the resulting liquid is passed through a flow pass 24 using a pump 20 to an ultrasonic dispersing device 26, and is then subjected to dispersion to break the aggregated particles of the cerium oxide. Subsequently, the particle size distribution is monitored using a particle size measuring device 27 provided in the downstream of the ultrasonic disperser 26. Upon confirming that the particle size distribution has reached a desired value, a three-way valve 25 is controlled, and the resulting cerium oxide-dispersing liquid 22 is then passed through a flow pass 29. The regenerated abrasive can be thus obtained.

Preferably, a change with time of the particle size distribution obtained in this step is small, and a change in the particle size after one day has passed is small.

[Regenerated Abrasive Containing Cerium Oxide]

In the present invention, the particle size distribution of the regenerated abrasive containing the cerium oxide obtained through the particle size adjusting step D as a final product is difficult to change with time. The concentration is higher than that after the collection. The concentration of magnesium is preferably ranges from 0.0005 to 0.08% by mass, and the concentration (s) of the other component (s) are preferably 1.0% by mass or less in total.

The regenerated abrasive obtained by the method for regenerating an abrasive contains a slight amount of the divalent alkali earth metal salt such as a magnesium salt. Generation of too fine particles in the use of the regenerated abrasive can therefore be suppressed and the regenerated abrasive can polish an object equivalently to a fresh abrasive.

Example

The present invention will now be described in detail with reference to Examples, but the present invention is not limited thereto. The percent sign "%" in the following description means "% by mass" unless described otherwise.

<<Preparation of Regenerated Abrasive>>

[Preparation of Regenerated Abrasive 1: Present Invention]

A regenerated abrasive 1 was prepared through the following steps. Regeneration of an abrasive was conducted at 25° C. and 55% RH unless described otherwise. In the regeneration, the temperature of the liquid was also 25° C.

1) Slurry Collecting Step A

After a glass substrate for a hard disc was polished as a polishing process illustrated in FIG. 1, 210 liters of the first abrasive-containing slurry which contained the washing water and 30 liters of the second abrasive-containing slurry which had been used were collected, and then mixed to obtain 240 liters of the collected slurry. The specific weight of this collected slurry was 1.03, and the collected slurry contained 8.5 kg of the cerium oxide.

2) Separating and Concentrating Step B

Subsequently, 2.5 liters of 10-% aqueous solution by mass of magnesium chloride was added spending 10 minutes while the collected slurry was stirred so as to avoid sedimentation of the cerium oxide. The converted pH value right after (upon) the end of adding magnesium chloride at 25° C. was 8.60.

3) Abrasive Collecting Step C

The above stirring was continued for 30 minutes, and then the resulting slurry was left to stand for 1.5 hours to separate the aggregate 18 and let it settle out from the supernatant 17 utilizing spontaneous sedimentation. After 1.5 hours had passed, the supernatant 17 was discharged using the discharging pump 20 in accordance with the step (C-1) in FIG. 2, and the aggregate 18 was separated and collected in accordance with the step (C-2) in FIG. 2. The volume of the collected aggregate was 60 liters.

4) Particle Size Adjusting Step D (Dispersing Step)

To the separated aggregate, 12 liters of water was added. In addition, 300 g of POLITY A-550 (Manufactured by Lion Corporation) was added as the metal-separating agent (dispersing agent composed of a polymer) to the separated aggregate, followed by stirring for 30 minutes. Thereafter, the aggregate was broken and dispersed using an ultrasonic disperser as illustrated in FIG. 3.

After the dispersion was completed, then filtration was conducted using a membrane filter with a pore size of 10 μm to obtain the regenerated cerium oxide-containing abrasive 1. The concentration of the cerium oxide was 8.7% by mass, and the particle size D90 was less than 2.0 μm. The concentration of magnesium in the regenerated abrasive was 0.03% by mass.

[Preparation of Regenerated Abrasive 2: Present Invention]

A regenerated abrasive 2 was prepared by the same way as the regenerated abrasive 1 was prepared except that magnesium sulfate was used in place of magnesium chloride as the inorganic salt used in 2) the separating and concentrating step B.

[Preparation of Regenerated Abrasive 3: Present Invention]

A regenerated abrasive 3 was prepared by the same way as the regenerated abrasive 1 was prepared except that a bead mill disperser was used in place of the ultrasonic disperser as the dispersing device in 4) the particle size adjusting step D (dispersing step).

[Preparation of Regenerated Abrasive 4: Comparative Example]

A regenerated abrasive 4 was prepared by the same way as the regenerated abrasive 1 was prepared except that potassium carbonate was used in place of magnesium chloride as the inorganic salt used in 2) the separating and concentrating step B.

[Preparation of Regenerated Abrasive 5: Comparative Example]

A regenerated abrasive 5 was prepared by the same way as the regenerated abrasive 1 was prepared except that the pH of the collected slurry was adjusted to 10.10 using potassium hydroxide after adding magnesium chloride as the inorganic salt to the collected slurry in 2) the separating and concentrating step B.

[Preparation of Regenerated Abrasive 6: Comparative Example]

A regenerated abrasive 6 was prepared by the same way as the regenerated abrasive 1 was prepared except that the pH was adjusted to 10.80 using potassium hydroxide after adding magnesium chloride as the inorganic salt to the collected slurry in 2) the separating and concentrating step B.

[Preparation of Regenerated Abrasive 7: Present Invention]

A regenerated abrasive 7 was prepared by the same way as the regenerated abrasive 1 was prepared except that a 25% aqueous solution by mass of magnesium sulfate was added in place of the 10% aqueous solution by mass of magnesium chloride as the inorganic salt in 2) the separating and concentrating step B, and the slurry was put into an in-line ultrasonic disperser (UIP2000, manufactured by Hielscher GmBH) before subjected to the filtration using the membrane filter with a pore size of 10 μm.

The concentration of the cerium oxide in the regenerated abrasive 7 was 9.0% by mass, and the particle size D90 was less than 2.0 μm. The concentration of magnesium was 0.04% by mass. The ratio of collecting the cerium oxide was 83%.

[Preparation of Regenerated Abrasives 8 to 11]

In preparing regenerated abrasives 8 to 11, sodium chloride (regenerated abrasive 8), sodium sulfate (regenerated abrasive 9), potassium chloride (regenerated abrasive 10), and calcium chloride (regenerated abrasive 11) were used, respectively, in place of the organic salt in 2) the separating and concentrating step B under the condition same as the condition in the step B in the preparation of the regenerated abrasive 1. In the case where sodium chloride was added and the case where sodium sulfate was added, no aggregation occurred after the continuous stirring for 30 minutes and the subsequent standing for 1.5 hours. In the case where potassium chloride was used and the case where calcium chloride was used, the aggregation speed was low. In addition, the glass component was aggregated together with the abrasive component, and thus the glass component was not separated.

<<Evaluation of Regenerated Abrasive>>

[Evaluation for Purity of Regenerated Abrasive: Evaluation for Separability from Glass Component]

In the preparation of the above regenerated abrasives 1 to 5, samples were taken from the collected slurries before the addition of the inorganic salt in 2) the separating and concentrating step B and from the supernatants after the standing and the separation. The taken samples were then subjected to component analysis using an ICP Atomic Emission spectrometer. If the concentration of cerium in the sample from the supernatant was lower than that in the sample from the un-treated collected slurry and the concentrations of silicon did not differ from each other, it is concluded that only the cerium oxide particles settled out and the glass particles which are not derived from the abrasive did not settle out and remained in the supernatant. On the other hand, if the concentration of cerium and the concentration of silicon in the sample from the supernatant are both lower than those in the sample from the un-treated collected slurry, it is concluded that the cerium oxide particles and the glass particles both settled out and thus they are not sufficiently separated from each other.

(Component Analysis using ICP Atomic Emission Spectrometry)

The concentrations of the cerium component and the glass component (Si) in each sample from the separated supernatant were measured using ICP Atomic Emission Spectrometry, and compared to those in each sample from the untreated used slurry (i.e., the slurry to which no additive was added). Specific steps are described below.

<Preparation of Sample Solution A>

(a) 1 ml of a sample was taken from the un-treated collected slurry or the supernatant being stirred by a stirrer (b) 5 ml of hydrofluoric acid for atomic absorption was added to the sample (c) silica was eluted by ultrasonic dispersion (d) the sample was left to stand at room temperature for 30 minutes (e) ultrapure water was added to the sample to obtain a volume of 50 ml Each sample liquid prepared through the above steps is called the sample liquid A.

<Quantification of Si and Mg>

(a) the sample liquid A was filtrated using a membrane filter (hydrophilic PTFE)

(b) the filtrate was subjected to measurement using an Inductivity Coupled Plasma Atomic Emission spectrometer (ICP-AES)

(c) Si was quantified through a standard addition method, and Mg was quantified through a calibration-curve method using matrix matching <Quantification of Cerium>

(a) 5 ml of a sample was taken from the sample liquid in a well dispersing state (b) 5 ml of high-purity sulfuric acid was added to the above taken sample (c) ultrapure water was added to the resulting sample to obtain a volume of 50 ml (d) the resulting sample was diluted as needed and subjected to measurement using ICP-AES (e) cerium was quantified through a calibration-curve method using matrix matching <ICP Atomic Emission spectrometer>

An ICP-AES manufactured by SII nanotechnology Inc. was used.

Results from the measurements are shown in Table 1.

TABLE 1

| Regenerated abrasive No. | Inorganic salt | pH of slutty at the end of adding inorganic salt | Dispersing device in particle size adjusting step | Analysis of supernatant using ICP | | Note |
|---|---|---|---|---|---|---|
| | | | | Si concentration | Ce concentration | |
| 1 | Magnesium Chloride | 8.60 | Ultrasonic Disperser | 978 | 41 | Present Inention |
| 2 | Magiesium Sulfate | 8.94 | Ultrasonic Disperser | 918 | 50 | Present Inention |
| 3 | Magnesium Chloride | 8.60 | Bead mill disperser | 970 | 43 | Present Inention |
| 4 | Pottasium Carbonate | 9.86 | Ultrasonic Disperser | 186 | 30 | Comparative Example |
| 5 | Magnesium Chloride | 10.10 | Ultrasonic Disperser | 91 | 26 | Comparative Example |
| 6 | Magnesium Chloride | 10.80 | Ultrasonic Disperser | 61 | 18 | Comparative Example |
| Reference: Un-treated slurry | | | | 1060 | 5400 | |

As evident from the results shown in Table 1, the method of the present invention for regenerating an abrasive is excellent in separability of the cerium oxide (i.e., the abrasive) from the glass component (i.e., the non-abrasive component) in the precipitating and separating and thus can provide a higher-purity regenerated abrasive, compared to the methods of Comparative Examples for regenerating an abrasive.

INDUSTRIAL APPLICABILITY

The method of the present invention for regenerating an abrasive can be suitably applied to regenerate an abrasive used in fine polishing in a finishing process of optical glasses and crystal oscillators, because the method of the present invention can efficiently collect cerium oxide and can provide a regenerated abrasive in a simple manner.

DESCRIPTION OF REFERENCE SIGNS

1 Abrasive device
2 Abrasive surface plate
3 Polished object
4 Abrasive liquid
5 Slurry nozzle
7 Washing water
8 Washing water-spraying nozzle
10 Abrasive-containing wash liquid
13 Abrasive-containing slurry (Mother liquid)
14, 21 Conditioning container
15 Stirrer
16 Adding flask
17 Supernatant
18 Concentrate
19 Discharging pipe
20 Pump
25 Three-way valve
27 Particle size measuring device
F Abrasive cloth
$T_1$ Slurry tank
$T_2$ Washing water tank
$T_3$ Wash liquid tank

The invention claimed is:

1. A method for regenerating a cerium-oxide-containing abrasive from a used abrasive-containing slurry that was used in polishing an object mainly composed of silicon, the method comprising:
(A) collecting an abrasive-containing slurry discharged from an abrasive device;
(B) separating the cerium-oxide-containing abrasive from a mother liquid and concentrating the cerium-oxide-containing abrasive by adding a magnesium salt as an inorganic salt to the collected abrasive-containing slurry, separating the cerium-oxide-containing abrasive from a component derived from the polished object and aggregating the cerium-oxide-containing abrasive when the mother liquid has a pH ranging from 6.5 to less than 10.0 at 25° C.; and
(C) collecting the separated and concentrated cerium-oxide-containing abrasive,
wherein the cerium-oxide-containing abrasive consists of one or a plurality of rare-earth materials, and
wherein a first abrasive-containing slurry that contains washing water and a second abrasive-containing slurry that was used in polishing are collected in the step (A) such that the second abrasive-containing slurry is pooled to enable recirculation for polishing before being collected.

2. The method of claim 1, further comprising:
(D) adjusting sizes of particles of the collected abrasive.

3. The method of claim 2, wherein
in the step (C), the collecting is conducted through separation by decantation utilizing spontaneous sedimentation.

4. The method of claim 2, wherein
in the step (D), a dispersing agent is added to a liquid of the collected abrasive, and thereafter dispersion is conducted using an ultrasonic disperser or a bead mill disperser to control the sizes of the particles of the regenerated abrasive.

5. The method of claim 4, wherein
the disperser used in the step (D) is the ultrasonic disperser.

6. The method of claim 4, wherein
the dispersing agent comprises a poly-carboxylic acid-based polymer.

7. The method of claim 1, wherein
the first abrasive-containing slurry and the second abrasive-containing slurry collected in the step (A) are mixed before the steps (B) and (C).

8. The method of claim 1, wherein
the first abrasive-containing slurry and the second abrasive-containing slurry collected in the step (A) are separately subjected to the steps (B) and (C).

9. A method for regenerating a cerium-oxide-containing abrasive from a used abrasive-containing slurry that was used in polishing an object mainly composed of silicon, the method comprising:
(A) collecting an abrasive-containing slurry discharged from an abrasive device;
(B) separating the cerium-oxide-containing abrasive from a mother liquid and concentrating the cerium-oxide containing abrasive by adding a magnesium salt as an inorganic salt to the collected abrasive-containing slurry, separating the cerium-oxide-containing abrasive from a component derived from the polished object and aggregating the cerium-oxide-containing abrasive when the mother liquid has a pH ranging from 6.5 to less than 10.0 at 25° C.; and
(C) collecting the separated and concentrated cerium-oxide-containing abrasive,
wherein:
a first abrasive-containing slurry that contains washing water and a second abrasive-containing slurry that was used in polishing are collected in the step (A), and the first abrasive-containing slurry and the second abrasive-containing slurry collected in the step (A) are mixed before the steps (B) and (C) such that the second abrasive-containing slurry is pooled to enable recirculation for polishing before being collected.

10. A method for regenerating a cerium-oxide-containing abrasive from a used abrasive-containing slurry that was used in polishing an object mainly composed of silicon, the method comprising:
(A) collecting an abrasive-containing slurry discharged from an abrasive device;
(B) separating the cerium-oxide-containing abrasive from a mother liquid and concentrating the cerium-oxide-containing abrasive by adding a magnesium salt as an inorganic salt to the collected abrasive-containing slurry, separating the cerium-oxide-containing abrasive from a component derived from the polished object and aggregating the cerium-oxide-containing abrasive when the mother liquid has a pH ranging from 6.5 to less than 10.0 at 25° C.; and
(C) collecting the separated and concentrated cerium-oxide-containing abrasive, wherein:
a first abrasive-containing slurry that contains washing water and a second abrasive-containing slurry that was used in polishing are collected in the step (A), and the first abrasive-containing slurry and the second abrasive-containing slurry collected in the step (A) are separately subjected to the steps (B) and (C) such that the second abrasive-containing slurry is pooled to enable recirculation for polishing before being collected.

* * * * *